US012784729B2

(12) United States Patent
Oishi et al.

(10) Patent No.: US 12,784,729 B2
(45) Date of Patent: Nov. 3, 2026

(54) PSEUDO-SOUND GENERATION DEVICE

(71) Applicant: Panasonic Automotive Systems Co., Ltd., Kanagawa (JP)

(72) Inventors: Takahiro Oishi, Osaka (JP); Masahide Onishi, Osaka (JP); Fumiyasu Konno, Osaka (JP); Yusuke Ukawa, Hyogo (JP); Seiichi Yoshida, Osaka (JP); Taiki Kodatsu, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 196 days.

(21) Appl. No.: 18/770,115

(22) Filed: Jul. 11, 2024

(65) Prior Publication Data

US 2024/0363097 A1 Oct. 31, 2024

Related U.S. Application Data

(63) Continuation of application No. PCT/JP2022/046787, filed on Dec. 20, 2022.

(30) Foreign Application Priority Data

Jan. 20, 2022 (JP) ................................ 2022-006957

(51) Int. Cl.
*G10K 15/02* (2006.01)

(52) U.S. Cl.
CPC ................................... *G10K 15/02* (2013.01)

(58) Field of Classification Search
CPC ........ G10K 15/02; G10K 15/04; B60R 11/02; H04R 3/00; H04R 2499/13; B60K 35/26; B60K 35/28

(Continued)

(56) References Cited

U.S. PATENT DOCUMENTS 5,635,903 A * 6/1997 Koike .................... B60Q 5/008 340/384.1
10,065,561 B1 * 9/2018 Bastyr .................... G10K 15/02

(Continued)

FOREIGN PATENT DOCUMENTS

JP 2014-202856 10/2014
JP 2014-240239 12/2014

(Continued)

OTHER PUBLICATIONS

International Search Report issued in International Pat. Appl. No. PCT/JP2022/046787, dated Mar. 20, 2023, along with an English translation thereof.

*Primary Examiner* — Duc Nguyen
*Assistant Examiner* — Chimezie Ezeriwe Bekee
(74) *Attorney, Agent, or Firm* — Greenblum & Bernstein, P.L.C.

(57) ABSTRACT

A pseudo-sound generation device includes: a sound reproducer that obtains and outputs first pseudo-sound information indicating first pseudo sounds corresponding to vehicle state information; a first controller that generates, based on the vehicle state information, first adjusted pseudo-sound information indicating pseudo sounds that are the first pseudo sounds that have been adjusted and are indicated in the first pseudo-sound information output by the sound reproducer, and outputs the first adjusted pseudo-sound information generated; a sound source generator that generates, based on the vehicle state information, second pseudo-sound information indicating a second pseudo sound, and outputs the second pseudo-sound information generated; and a second controller that generates second adjusted pseudo-sound information indicating a pseudo sound that is the second pseudo sound that has been adjusted and is indicated in the second pseudo-sound information (Continued)

output by the sound source generator, and outputs the second adjusted pseudo-sound information generated.

2 Claims, 4 Drawing Sheets

(58) Field of Classification Search
USPC .............................................................. 700/94
See application file for complete search history.

(56) References Cited

U.S. PATENT DOCUMENTS

| | | | | |
|---|---|---|---|---|
| 2005/0113168 | A1 * | 5/2005 | Maeda | G10K 15/02 463/35 |
| 2014/0056438 | A1 | 2/2014 | Baalu et al. | |
| 2017/0001559 | A1 * | 1/2017 | Kwon | G10K 15/02 |
| 2021/0225356 | A1 * | 7/2021 | Miura | G10K 15/02 |

FOREIGN PATENT DOCUMENTS

| | | | |
|---|---|---|---|
| JP | 2015-082029 | 4/2015 | |
| JP | 2015-533702 | 11/2015 | |
| WO | WO-2012016722 A2 * | 2/2012 | A63H 5/00 |
| WO | 2014/031621 | 2/2014 | |

* cited by examiner

PSEUDO-SOUND GENERATION DEVICE

CROSS REFERENCE TO RELATED APPLICATIONS

This is a continuation application of PCT International Application No. PCT/JP2022/046787 filed on Dec. 20, 2022, designating the United States of America, which is based on and claims priority of Japanese Patent Application No. 2022-006957 filed on Jan. 20, 2022. The entire disclosures of the above-identified applications, including the specifications, drawings and claims are incorporated herein by reference in their entirety.

FIELD

The present disclosure relates to a pseudo-sound generation device.

BACKGROUND

Patent Literature (PTL) 1 discloses an engine sound output device that outputs engine sounds to the interior of a passenger cabin. The engine sound output device includes a storage that stores a plurality of items of engine sound information pertaining to engine sounds for respective rotation speeds of the engine, a generator that combines a plurality of signals based on the plurality of items of engine sound information to generate composite-sound information corresponding to traveling information, and a controller that causes an outputter provided inside the passenger cabin of a vehicle to output a pseudo-engine sound based on the generated composite-sound information.

CITATION LIST

Patent Literature

PTL 1: Japanese Unexamined Patent Application Publication No. 2014-202856

SUMMARY

Technical Problem

The above-described engine sound output device disclosed by PTL 1 can be improved upon.

In view of the above, the present disclosure provides a pseudo-sound generation device capable of improving upon the above related art.

Solution to Problem

A pseudo-sound generation device according to one aspect of the present disclosure is a pseudo-sound generation device that outputs a pseudo sound corresponding to a traveling state of a vehicle. The pseudo-sound generation device includes: a sound reproducer that obtains and outputs first pseudo-sound information indicating first pseudo sounds corresponding to vehicle state information that pertains to traveling states of the vehicle; a first controller that generates, based on the vehicle state information, first adjusted pseudo-sound information indicating pseudo sounds that are the first pseudo sounds that have been adjusted, and outputs the first adjusted pseudo-sound information generated, the first pseudo sounds being indicated in the first pseudo-sound information output by the sound reproducer; a sound source generator that generates, based on the vehicle state information, second pseudo-sound information indicating a second pseudo sound, and outputs the second pseudo-sound information generated; and a second controller that generates second adjusted pseudo-sound information indicating a pseudo sound that is the second pseudo sound that has been adjusted, and outputs the second adjusted pseudo-sound information generated, the second pseudo sound being indicated in the second pseudo-sound information output by the sound source generator.

Note that some of specific aspects among the above-described aspects may be implemented using a system, a method, an integrated circuit, a computer program, or a computer-readable recording medium, such as a CD-ROM, or may be implemented using any optional combination of systems, methods, integrated circuits, computer programs, and computer-readable recording media.

Advantageous Effects

A pseudo-sound generation device according to the present disclosure is capable of improving upon the above related art.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Note that the embodiments, etc., described below each represents a general or specific example. The numerical values, shapes, materials, elements, the arrangement and connection of the elements, steps, orders of the steps, etc. presented in the embodiment below are mere examples, and are not intended to limit the present disclosure. Furthermore, among the elements in the embodiments below, those not recited in any one of the independent claims will be described as optional elements. Moreover, the embodiments may be combined.

The drawings are schematic diagrams, and do not necessarily provide strictly accurate illustrations. Throughout the drawings, the same reference sign is given to the same element.

Hereinafter, a pseudo-sound generation device according to the present disclosure will be described in detail with reference to the drawings.

EMBODIMENT

[Configuration]

Figure 1:
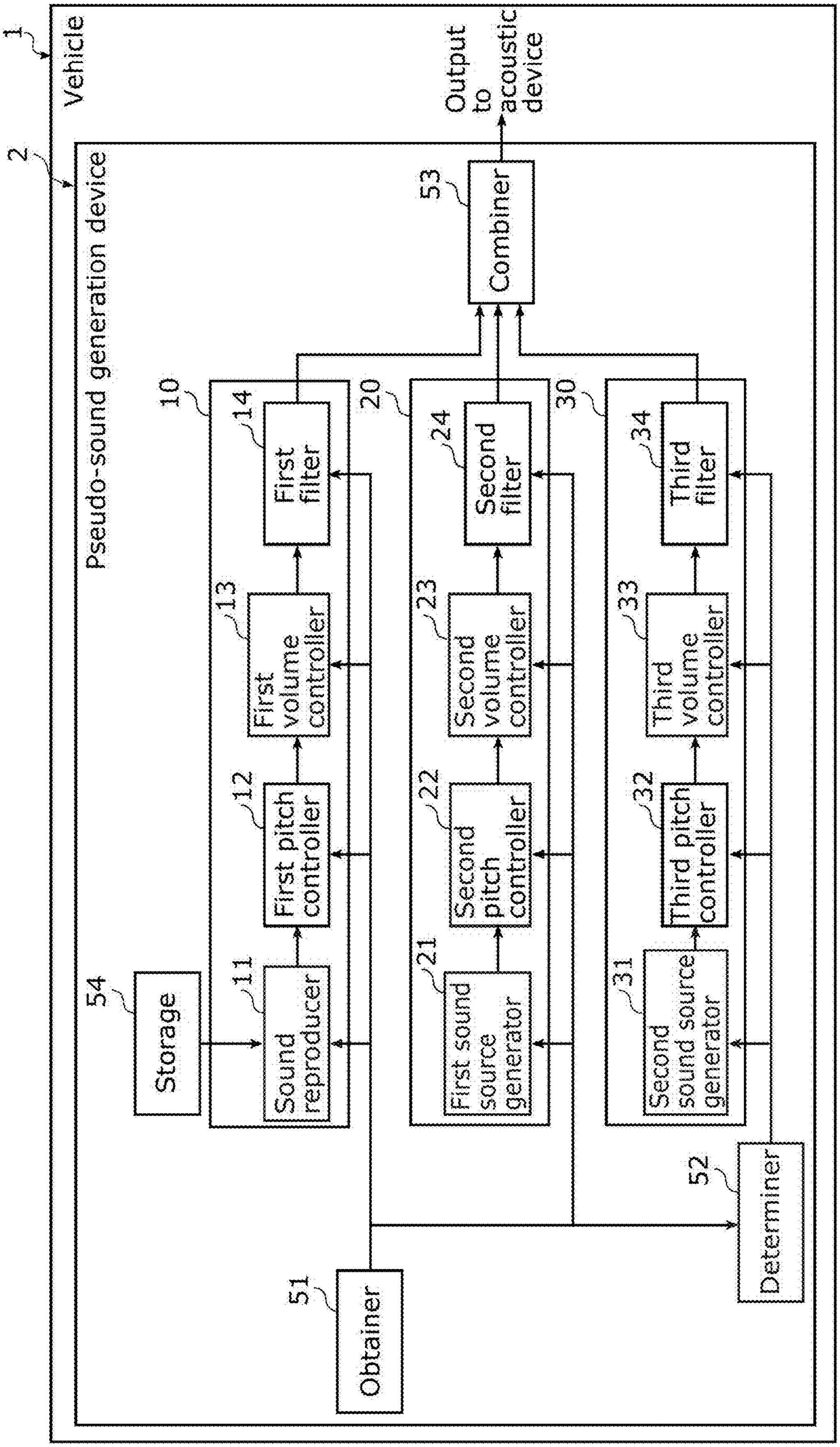
FIG. 1 is a block diagram illustrating a pseudo-sound generation device according to an embodiment.

FIG. 1 is a block diagram illustrating pseudo-sound generation device 2 according to an embodiment.

As illustrated in FIG. 1, pseudo-sound generation device 2 is provided in vehicle 1, and can output pseudo sounds corresponding to traveling states of vehicle 1 to the interior of a passenger cabin of vehicle 1. In other words, pseudo-sound generation device 2 can output pseudo sounds to the interior of the passenger cabin to give passengers in vehicle 1 a real feeling of traveling vehicle 1 and a feeling of operating vehicle 1. The pseudo sounds include, for example, pseudo sounds imitating sounds generated when an electric motor, an internal-combustion engine, etc. are driven, pseudo sounds representing a right turn, left turn, etc., and pseudo sounds imitating sounds generated when an accelerator is operated, when vehicle 1 is accelerated, when vehicle 1 is skidded, when sudden acceleration occurs, when harsh braking is applied, when an after fire occurs, etc.

Pseudo-sound generation device 2 includes obtainer 51, storage 54, first sound control device 10, second sound control device 20, determiner 52, third sound control device 30, and combiner 53.

[Obtainer 51]

Obtainer 51 obtains vehicle state information. The vehicle state information pertains to traveling states of vehicle 1. The vehicle state information includes, for example, an acceleration rate of vehicle 1, a speed of vehicle 1, an accelerator operation amount that is an amount of pressure applied to the gas pedal, a right or left turn made by vehicle 1, a brake operation amount, driving sounds of the electric motor and internal-combustion engine, an after fire, a skid of a wheel, a gear operation, driving torque, a rotation speed of the engine motor, etc. Note that obtainer 51 may obtain external environment information indicating environments outside a vehicle.

For example, obtainer 51 is a sensor capable of obtaining the vehicle state information. In addition, obtainer 51 may include a sound pickup unit that picks up sounds, such as brake sounds, acceleration sounds, and wheel skidding sounds. Obtainer 51 outputs obtained vehicle state information to first sound control device 10, second sound control device 20, and determiner 52. Note that obtainer 51 may output obtained external environment information to first sound control device 10, second sound control device 20, and determiner 52.

Storage 54

Storage 54 stores items of information indicating pseudo sounds corresponding to the following respective items: the magnitude of an acceleration rate of vehicle 1, the magnitude of a speed of vehicle 1, the magnitude of an accelerator operation amount, the magnitude of a steering angle at which a right or left turn is made by vehicle 1, the magnitude of a brake operation amount, a driving amount of the electric motor and internal-combustion engine, a skidded amount of a wheel, the magnitude of an after fire, etc. More specifically, storage 54 stores pseudo sounds for the following respective items: acceleration rates of vehicle 1, speeds of vehicle 1, accelerator operation amounts, steering angles at which vehicle 1 makes right or left turns, brake operation amounts, rotation speeds of the electric motor, rotation speeds of the internal-combustion engine, and after fires.

The items of information indicating pseudo sounds stored in storage 54 are associated with respective traveling states of vehicle 1. Accordingly, pseudo-sound generation device 2 can cause an acoustic device to reproduce a pseudo sound corresponding to a traveling state of vehicle 1.

[First Sound Control Device 10]

First sound control device 10 obtains, based on vehicle state information obtained from obtainer 51, first pseudo sounds that are pseudo sounds stored in storage 54. First sound control device 10 then adjusts the volume, pitch, etc. of the obtained first pseudo sounds and outputs the adjusted first pseudo sounds. Here, the first pseudo sounds are pseudo sounds stored in storage 54, and are, for example, sounds imitating the magnitude of an acceleration rate of vehicle 1, the magnitude of a speed of vehicle 1, the magnitude of an accelerator operation amount, the magnitude of a steering angle at which a right or left turn is made by vehicle 1, the magnitude of a brake operation amount, a driving amount of the electric motor and internal-combustion engine, a skidded amount of a wheel, the magnitude of an after fire, etc.

More specifically, first sound control device 10 includes sound reproducer 11, first pitch controller 12, first volume controller 13, and first filter 14.

Sound reproducer 11 obtains, based on the vehicle state information, pseudo sounds corresponding to traveling states of vehicle 1 which are indicated in the vehicle state information. In other words, sound reproducer 11 may obtain first pseudo-sound information that is information indicating first pseudo sounds corresponding to the vehicle state information from storage 54, and may reproduce, according to the vehicle state information, the first pseudo sounds indicated in the obtained first pseudo-sound information. For example, when the vehicle state information indicates acceleration of vehicle 1, sound reproducer 11 obtains, from the storage, first pseudo-sound information corresponding to the acceleration rate of vehicle 1, and reproduces a first pseudo sound indicated in the first pseudo-sound information. Sound reproducer 11 outputs the first pseudo-sound information indicating the first pseudo sounds to first pitch controller 12.

Note that when the vehicle state information includes driving sounds of the electric motor and internal-combustion engine, sound reproducer 11 may obtain actual driving sounds produced by the electric motor and internal-combustion engine as pseudo sounds.

First pitch controller 12 obtains the first pseudo-sound information from sound reproducer 11, and controls the pitch of the first pseudo sounds indicated in the obtained first pseudo-sound information. In this case, first pitch controller 12 controls the pitch of the first pseudo sounds based on the vehicle state information. More specifically, first pitch controller 12 controls the pitch of the first pseudo sounds by modulating the pitch of first pseudo sounds according to the speed of vehicle 1 and the rotation speed of the engine of vehicle 1 which are included in the vehicle state information. For example, first pitch controller 12 controls the pitch of the first pseudo sounds by modulating the pitch of the first pseudo sounds such that the pitch of the first pseudo sounds rises with an increase in the speed of vehicle 1 and an increase in the rotation speed of the engine. First pitch controller 12 outputs, to first volume controller 13, the first pseudo-sound information indicating the first pseudo sounds whose pitch has been controlled. Here, first pitch controller 12 is included in a first controller.

First volume controller 13 obtains the first pseudo-sound information indicating the first pseudo sounds whose pitch has been controlled from first pitch controller 12, and controls the volume of the first pseudo sounds whose pitch has been controlled. In this case, first volume controller 13 controls, based on the vehicle state information, the volume of the first pseudo sounds whose pitch has been controlled. More specifically, first volume controller 13 controls the volume of the first pseudo sounds by modulating the volume of the first pseudo sounds according to an accelerator operation amount of vehicle 1, a speed of vehicle 1, and inertial force of vehicle 1 (inertial force (gravity (G)) due to acceleration, braking, a right turn or left turn, etc.). For example, first volume controller 13 controls the volume of the first pseudo sounds whose pitch has been controlled by modulating the volume of the first pseudo sounds such that the volume of the first pseudo sounds increases with an increase in the speed of vehicle 1. First volume controller 13 outputs the first pseudo-sound information indicating the first pseudo sounds whose volume has been further controlled to first filter 14. Here, first volume controller 13 is included in the first controller.

First filter 14 obtains, from first volume controller 13, the first pseudo-sound information indicating the first pseudo sounds whose pitch and volume have been controlled. First filter 14 can extract signals in a set frequency band from the first pseudo sounds whose volume and pitch have been controlled and which are indicated in the first pseudo-sound information. In other words, first filter 14 can appropriately change the frequency bandwidth and magnitude of the frequency of the first pseudo sounds whose pitch and volume have been controlled. First filter 14 changes the frequency of the first pseudo sounds based on the vehicle state information and extracts the first pseudo sounds whose frequency has been changed based on the vehicle state information, to generate first adjusted pseudo-sound information. The first adjusted pseudo-sound information is information indicating pseudo sounds that are the first pseudo sounds that have been adjusted. Here, the pseudo sounds that are the first pseudo sounds that have been adjusted are pseudo sounds obtained by adjusting at least any one of the pitch, volume, frequency, etc. of the first pseudo sounds. First filter 14 outputs the generated first adjusted pseudo-sound information to combiner 53.

First filter 14 includes at least one of a low-pass filter, a band-pass filter, and a high-pass filter. Each of the low-pass filter, band-pass filter, and high-pass filter may include an analogue circuit or may be implemented by digital signal processing. Note that although first filter 14 is a variable filter, first filter 14 may be a fixed filter. Moreover, although the low-pass filter, band-pass filter, and high-pass filter are presented as examples of first filter 14, first filter 14 is not limited to these filters and other filters may be used.

[Second Sound Control Device 20]

When vehicle 1 is started (when the ignition switch is turned ON), second sound control device 20 generates a pseudo sound based on the vehicle state information obtained from obtainer 51, adjusts the volume, pitch, etc. of the generated pseudo sound, and outputs the adjusted pseudo sound. In other words, irrespective of whether vehicle 1 is traveling or not, starting of vehicle 1 causes second sound control device 20 to adjust the volume, pitch, etc. of the pseudo sound to output the adjusted pseudo sound.

More specifically, second sound control device 20 includes first sound source generator 21, second pitch controller 22, second volume controller 23, and second filter 24. Here, first sound source generator 21 is included in a sound source generator.

First sound source generator 21 is a synthesizer that employs a calculation-type sound source method that can generate realistic sounds and sounds that give a passenger a feeling of operating a vehicle to be output to the interior of the passenger cabin. More specifically, first sound source generator 21 generates 2-1th pseudo-sound information based on the vehicle state information, and outputs the generated 2-1th pseudo-sound information to second pitch controller 22.

For example, first sound source generator 21 can generate a pseudo sound using an additive synthesis method, a frequency modulation (FM) method, a subtractive synthesis method, a wavetable method, or the like.

Here, the 2-1th pseudo-sound information indicates a 2-1th pseudo sound that imitates a sound generated according to a continuous traveling state of vehicle 1. For example, the 2-1th pseudo-sound information is a sound continuously generated when vehicle 1 is driven. More specifically, the 2-1th pseudo-sound information indicates a sound of an acceleration rate of vehicle 1, a sound of a speed of vehicle 1, a sound of an accelerator operation amount, a sound of a left turn or right turn made by vehicle 1, a sound of a brake operation amount, or driving sounds of the electric motor and internal-combustion engine, etc. Moreover, the 2-1th pseudo sound imitates a sound continuously generated when vehicle 1 is driven, such as a sound of an acceleration rate of vehicle 1, a sound of a speed of vehicle 1, a sound of an accelerator operation amount, a sound of a left turn or right turn made by vehicle 1, a sound of a brake operation amount, or driving sounds of the electric motor and internal-combustion engine, etc. For example, when the operator included in the passengers applies pressure on the gas pedal, first sound source generator 21 uses a driving sound generated due to driving of the internal-combustion engine as a 2-1th pseudo sound to generate 2-1th pseudo-sound information.

Here, first sound source generator 21 is included in a sound source generator. In addition, the 2-1th pseudo sound is included in a second pseudo sound. Moreover, the 2-1th pseudo-sound information is included in second pseudo-sound information.

Second pitch controller 22 obtains the 2-1th pseudo-sound information from first sound source generator 21, and controls the pitch of the 2-1th pseudo sound indicated in the obtained 2-1 pseudo-sound information. In this case, second pitch controller 22 controls the pitch of the 2-1th pseudo sound based on the vehicle state information. More specifically, second pitch controller 22 controls the pitch of the 2-1th pseudo sound according to the speed of vehicle 1 and the rotation speed of the engine which are included in the vehicle state information. For example, second pitch controller 22 controls the pitch of the 2-1th pseudo sound such that the pitch of the 2-1th pseudo sound rises with an increase in the speed of vehicle 1 and an increase in the rotation speed of the engine. Second pitch controller 22 outputs, to second volume controller 23, the 2-1th pseudo-sound information that is the 2-1th pseudo sound whose pitch has been controlled. Here, second pitch controller 22 is included in a second controller.

Second volume controller 23 obtains, from second pitch controller 22, the 2-1th pseudo-sound information indicating the 2-1th pseudo sound whose pitch has been controlled, and controls the volume of the 2-1th pseudo sound whose pitch has been controlled and which is indicated in the 2-1th pseudo-sound information. In this case, second volume controller 23 controls, based on the vehicle state information, the volume of the 2-1th pseudo sound whose pitch has been controlled. More specifically, second volume controller 23 controls the volume of the 2-1th pseudo sound according to the accelerator operation amount of vehicle 1, the speed of vehicle 1, and the inertial force of vehicle 1 which are included in the vehicle state information. For example, second volume controller 23 controls the volume of the 2-1th pseudo sound whose pitch has been controlled such that the volume of the 2-1th pseudo sound increases with an increase in the speed of vehicle 1. Second volume controller 23 outputs the 2-1th pseudo-sound information that is the 2-1th pseudo sound whose volume has been further controlled to second filter 24. Here, second volume controller 23 is included in the second controller.

Second filter 24 obtains, from second volume controller 23, the 2-1th pseudo-sound information that is the 2-1th pseudo sound whose pitch and volume have been controlled. Second filter 24 can extract a signal in a set frequency band from the 2-1th pseudo sound whose volume and pitch have been controlled and which is indicated in the 2-1th pseudo-sound information. In other words, second filter 24 can appropriately change the frequency bandwidth and magnitude of the frequency of the 2-1th pseudo sound whose pitch and volume have been controlled. Second filter 24 changes the frequency of the 2-1th pseudo sound based on the vehicle state information and extracts the 2-1th pseudo sound whose frequency has been changed based on the vehicle state information, to generate 2-1th adjusted pseudo-sound information. The 2-1th adjusted pseudo-sound information is information indicating a pseudo sound that is the 2-1th pseudo sound that has been adjusted. Here, the 2-1th adjusted pseudo-sound information is included in the second adjusted pseudo-sound information. Moreover, the pseudo sound that is the 2-1th pseudo sound that has been adjusted is a pseudo sound obtained by adjusting at least any one of the pitch, volume, frequency, etc. of the 2-1th pseudo sound. Second filter 24 outputs the generated 2-1th adjusted pseudo-sound information to combiner 53.

Second filter 24 includes at least one of a low-pass filter, a band-pass filter, and a high-pass filter. Each of the low-pass filter, band-pass filter, and high-pass filter may include an analogue circuit or may be implemented by digital signal processing. Note that although second filter 24 is a variable filter, second filter 24 may be a fixed filter. Moreover, although the low-pass filter, band-pass filter, and high-pass filter are presented as examples of second filter 24, second filter 24 is not limited to these filters and other filters may be used.

[Determiner 52]

Determiner 52 determines an operation state of vehicle 1, based on the vehicle state information obtained by obtainer 51. For example, when a traveling state of vehicle 1 indicated in the vehicle state information indicates a rapid increase in the acceleration rate, determiner 52 determines, as the operation state of vehicle 1, that a wheel has skidded. As another example, when a traveling state of vehicle 1 indicated in the vehicle state information indicates a rapid increase in the accelerator operation amount, determiner 52 determines that a sudden acceleration is made. As another example, when a traveling state of vehicle 1 indicated in the vehicle state information indicates that the steering angle is a predetermined angle or more in the clockwise direction, determiner 52 determines that vehicle 1 has made a right turn. Conversely, when a traveling state of vehicle 1 indicated in the vehicle state information indicates that the steering angle is a predetermined angle or more in the counterclockwise direction, determiner 52 determines that vehicle 1 has made a left turn. As another example, when a traveling state of vehicle 1 indicated in the vehicle state information indicates detection of abnormal combustion, determiner 52 determines that an after fire has occurred. Determiner 52 outputs, to third sound control device 30, a result of a determination made based on the vehicle state information.

[Third Sound Control Device 30]

Third sound control device 30 generates a pseudo sound based on the vehicle state information, adjusts the volume, pitch, etc. of the generated pseudo sound, and outputs the adjusted pseudo sound. More specifically, third sound control device 30 generates a pseudo sound based on the result of a determination made by determiner 52 using the vehicle state information, adjusts the volume, pitch, etc. of the generated pseudo sound, and outputs the adjusted pseudo sound.

More specifically, third sound control device 30 includes second sound source generator 31, third pitch controller 32, third volume controller 33, and third filter 34. Here, second sound source generator 31 is included in the sound source generator.

Second sound source generator 31 is a synthesizer that employs a calculation-type sound source method that can generate realistic sounds and sounds that give a passenger a feeling of operating a vehicle to be output to the interior of the passenger cabin.

Second sound source generator 31 generates 2-2th pseudo-sound information based on the result of a determination made by determiner 52. For example, when the result of the determination made by determiner 52 indicates a predetermined operation state of vehicle 1, second sound source generator 31 generates the 2-2th pseudo-sound information. The predetermined operation state is an operation state set in advance, and is a sporadic traveling state of vehicle 1, such as harsh braking, sudden acceleration, a sharp turn of the steering wheel, an after fire, and a skid of a wheel. When determiner 52 determines that the result of the determination does not apply to a predetermined operation state, determiner 52 does not output the result of the determination to second sound source generator 31. Accordingly, second sound source generator 31 does not output information to third pitch controller 32. Conversely, when determiner 52 determines that the result of the determination applies to a predetermined operation state, second sound source generator 31 outputs the generated 2-2th pseudo-sound information to third pitch controller 32.

For example, second sound source generator 31 can generate a pseudo sound using an additive synthesis method, an FM method, a subtractive synthesis method, a wavetable method, or the like.

Here, the 2-2th pseudo-sound information indicates a 2-2th pseudo sound that is a pseudo sound imitating a sound generated according to a sporadic traveling state of vehicle 1. For example, the 2-2th pseudo-sound information is a sound sporadically generated when vehicle 1 is driven. More specifically, the 2-2th pseudo-sound information indicates a sound of harsh braking, a sound of sudden acceleration, a sound of a sharp turn of the steering wheel, a sound of an after fire, or a sound of a skid of a wheel. In addition, the 2-2th pseudo sound imitates a sound sporadically generated when vehicle 1 is driven, such as a sound of harsh braking, a sound of sudden acceleration, a sound of a sharp turn of the steering wheel, a sound of an after fire, and a sound of a skid of a wheel. For example, when the operator included in the passengers applies pressure on the brake pedal, second sound source generator 31 uses a sound generated by the brake pedal as a 2-2th pseudo sound to generate 2-2th pseudo-sound information.

Here, second sound source generator 31 is included in the sound source generator. In addition, the 2-2th pseudo sound is included in the second pseudo sound. Moreover, the 2-2th pseudo-sound information is included in the second pseudo-sound information.

Second sound source generator 31 is an individual element different from first sound source generator 21. In addition, a 2-1th pseudo sound is a pseudo sound different from a 2-2th pseudo sound. In other words, a traveling state of vehicle 1 when a 2-1th is played inside a passenger cabin is different from a traveling state of vehicle 1 when a 2-2th pseudo sound is played inside the passenger cabin.

Third pitch controller 32 obtains the 2-2th pseudo-sound information from second sound source generator 31, and controls the pitch of the 2-2th pseudo sound indicated in the obtained 2-2 pseudo-sound information. In this case, third pitch controller 32 controls the pitch of the 2-2th pseudo sound based on the vehicle state information. More specifically, third pitch controller 32 controls the pitch of the 2-2th pseudo sound according to the speed of vehicle 1 and the rotation speed of the engine which are included in the vehicle state information. For example, third pitch controller 32 controls the pitch of the 2-2th pseudo sound such that the pitch of the 2-2th pseudo sound rises with an increase in the speed of vehicle 1 and an increase in the rotation speed of the engine. Third pitch controller 32 outputs the 2-2th pseudo-sound information that is the 2-2th pseudo sound whose pitch has been controlled to third volume controller 33. Here, third pitch controller 32 is included in the second controller.

Third volume controller 33 obtains, from third pitch controller 32, the 2-2th pseudo-sound information indicating the 2-2th pseudo sound whose pitch has been controlled, and controls the volume of the 2-2th pseudo sound whose pitch has been controlled and which is indicated in the 2-2th pseudo-sound information. In this case, third volume controller 33 controls, based on the vehicle state information, the volume of the 2-2th pseudo sound whose pitch has been controlled. More specifically, third volume controller 33 controls the volume of the 2-2th pseudo sound according to the accelerator operation amount of vehicle 1, the speed of vehicle 1, and the inertial force of vehicle 1 included in the vehicle state information. For example, third volume controller 33 controls the volume of the 2-2th pseudo sound whose pitch has been controlled such that the volume of the 2-2th pseudo sound increases with an increase in the speed of vehicle 1. Third volume controller 33 outputs, to third filter 34, the 2-2th pseudo-sound information that is the 2-2th pseudo sound whose volume has been further controlled. Here, third volume controller 33 is included in the second controller.

Third filter 34 obtains, from third volume controller 33, the 2-2th pseudo sound whose pitch and volume have been controlled. Third filter 34 can extract a signal in a set frequency band from the 2-2th pseudo sound whose volume and pitch have been controlled and which is indicated in the 2-2th pseudo-sound information. In other words, third filter 34 can appropriately change the frequency bandwidth and magnitude of the frequency of the 2-2th pseudo sound whose pitch and volume have been controlled. Third filter 34 changes the frequency of the 2-2th pseudo sound based on the vehicle state information and extracts the 2-2th pseudo sound whose frequency has been changed based on the vehicle state information, to generate 2-2th adjusted pseudo-sound information. The 2-2th adjusted pseudo-sound information is information indicating a pseudo sound that is the 2-2th pseudo sound that has been adjusted. Here, the 2-2th adjusted pseudo-sound information is included in the second adjusted pseudo-sound information. Moreover, the pseudo sound that is the 2-2th pseudo sound that has been adjusted is a pseudo sound obtained by adjusting at least any one of the pitch, volume, frequency, etc. of the 2-2th pseudo sound. Third filter 34 outputs the generated 2-2th adjusted pseudo-sound information to combiner 53.

Third filter 34 includes at least one of a low-pass filter, a band-pass filter, and a high-pass filter. Each of the low-pass filter, band-pass filter, and high-pass filter may include an analogue circuit or may be implemented by digital signal processing. Note that although third filter 34 is a variable filter, third filter 34 may be a fixed filter. Moreover, although the low-pass filter, band-pass filter, and high-pass filter are presented as examples of third filter 34, third filter 34 is not limited to these filters and other filters may be used.

[Combiner 53]

Combiner 53 may combine, into a composite sound, the pseudo sounds indicated in the first adjusted pseudo-sound information output by first sound control device 10 and the controlled 2-1th pseudo sound indicated in the 2-1th adjusted pseudo-sound information output by second sound control device 20, to output, to an acoustic device, first composite-sound information indicating the composite sound.

In addition, combiner 53 may combine, into a composite sound, the pseudo sounds indicated in the first adjusted pseudo-sound information output by first sound control device 10 and the controlled 2-2th pseudo sound indicated in the 2-2th adjusted pseudo-sound information output by third sound control device 30, to output, to the acoustic device, second composite-sound information indicating the composite sound.

Moreover, combiner 53 may combine, into a composite sound, the pseudo sounds indicated in the first adjusted pseudo-sound information output by first sound control device 10, the controlled 2-1th pseudo sound indicated in the 2-1th adjusted pseudo-sound information output by second sound control device 20, and the controlled 2-2th pseudo sound indicated in the 2-2th adjusted pseudo-sound information output by third sound control device 30, to output, to the acoustic device, third composite-sound information indicating the composite sound.

Combiner 53 may also output, to the acoustic device, fourth composite-sound information indicating the pseudo sounds indicated in the first adjusted pseudo-sound information output by first sound control device 10.

Furthermore, when determiner 52 determines that vehicle 1 is in a sporadic traveling state based on the vehicle state information, combiner 53 may output only the 2-2th pseudo-sound information to the acoustic device.

In other words, combiner 53 outputs, to the acoustic device, the first composite-sound information, the second composite-sound information, the third composite-sound information, the fourth composite-sound information, or the 2-2th pseudo-sound information.

Note that although pseudo-sound generation device 2 according to the present embodiment includes combiner 53, combiner 53 need not be included. In other words, combiner 53 is not an essential element to be included in pseudo-sound generation device 2. In this case, first sound control device 10 may output, to a first acoustic device, first pseudo sounds whose pitch and volume have been controlled and whose frequency has been changed. Second sound control device 20 may output, to a second acoustic device, a 2-1th pseudo sound whose pitch and volume have been controlled and whose frequency has been changed. Second sound control device 20 may also output, to a third acoustic device, the 2-1th pseudo sound whose pitch and volume have been controlled and whose frequency has been changed. In this case, the first pseudo sounds output from the first acoustic device and the 2-1th pseudo sound output from the second acoustic device may be combined into a composite sound. Moreover, the first pseudo sounds output from the first acoustic device and the 2-2th pseudo sound output from the second acoustic device may be combined into a composite sound. The first acoustic device, second acoustic device, and third acoustic device are, for example, loudspeakers provided in a vehicle.

[Processing Operation]

Processing operations performed by pseudo-sound generation device 2 according to the present embodiment will be described.

Operation Example 1

Figure 2:
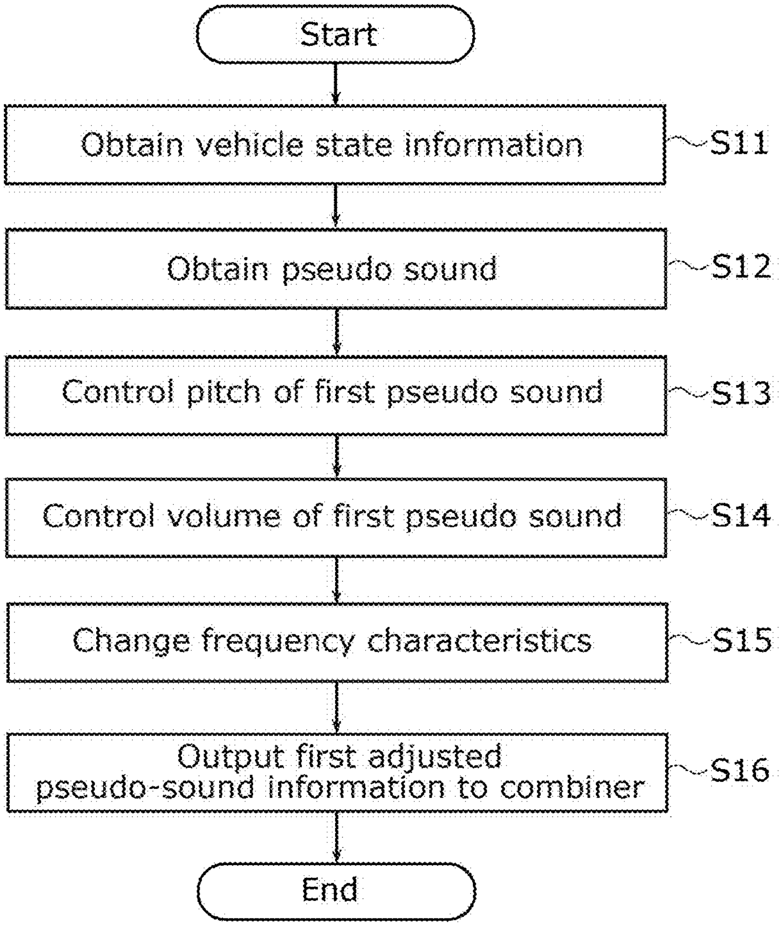
FIG. 2 is a flowchart illustrating processing operations performed when a first pseudo sound is output to a combiner.

FIG. 2 is a flowchart illustrating processing operations performed when first pseudo sounds are output to combiner 53. FIG. 2 illustrates processing operations performed by obtainer 51, first sound control device 10, and combiner 53.

First, obtainer 51 obtains vehicle state information, and outputs the obtained vehicle state information to first sound control device 10 (S11).

Next, sound reproducer 11 included in first sound controller 10 obtains, based on the vehicle state information obtained from obtainer 51, pseudo sounds corresponding to traveling states of vehicle 1 indicated in the vehicle state information (S12). More specifically, sound reproducer 11 may obtain first pseudo-sound information indicating first pseudo sounds corresponding to the vehicle state information from storage 54, and may reproduce, according to the vehicle state information, the first pseudo sounds indicated in the obtained first pseudo-sound information. In this case, sound reproducer 11 outputs the first pseudo-sound information indicating the reproduced first pseudo sounds to first pitch controller 12.

Next, when first pitch controller 12 obtains the first pseudo-sound information from sound reproducer 11, first pitch controller 12 controls the pitch of the reproduced first pseudo sounds indicated in the obtained first pseudo-sound information (S13). First pitch controller 12 outputs, to first volume controller 13, the first pseudo-sound information indicating the first pseudo sounds whose pitch has been controlled.

Next, when first volume controller 13 obtains, from first pitch controller 12, the first pseudo-sound information indicating the first pseudo sounds whose pitch has been controlled, first volume controller 13 controls the volume of the first pseudo sounds whose pitch has been controlled (S14). First volume controller 13 outputs, to first filter 14, the first pseudo-sound information indicating the first pseudo sounds whose volume has been further controlled, namely the first pseudo sounds whose pitch and volume have been controlled.

Next, when first filter 14 obtains, from first volume controller 13, the first pseudo-sound information indicating the first pseudo sounds whose pitch and volume have been controlled, first filter 14 extracts, from the obtained first pseudo-sound information, first pseudo sounds that are signals in a set frequency band (signals whose frequency characteristics have been changed) (S15).

Next, first filter 14 outputs, to combiner 53, the first pseudo sounds whose frequency has been changed. In other words, first sound control device 10 generates first adjusted pseudo-sound information indicating pseudo sounds obtained by changing the frequency of the first pseudo sounds and controlling the pitch, volume, etc. of the first pseudo sounds, and outputs the generated first adjusted pseudo-sound information to combiner 53 (S16). With this, combiner 53 combines, into a composite sound, the first pseudo sounds indicated in the first adjusted pseudo-sound information output by first sound control device 10 and either a pseudo sound indicated in information output by second sound control device 20 or a pseudo sound indicated in information output by third sound control device 30, and outputs the composite sound to an audio device.

Thereafter, pseudo-sound generation device 2 ends the processing operations shown in the flowchart of FIG. 2.

Operation Example 2

Figure 3:
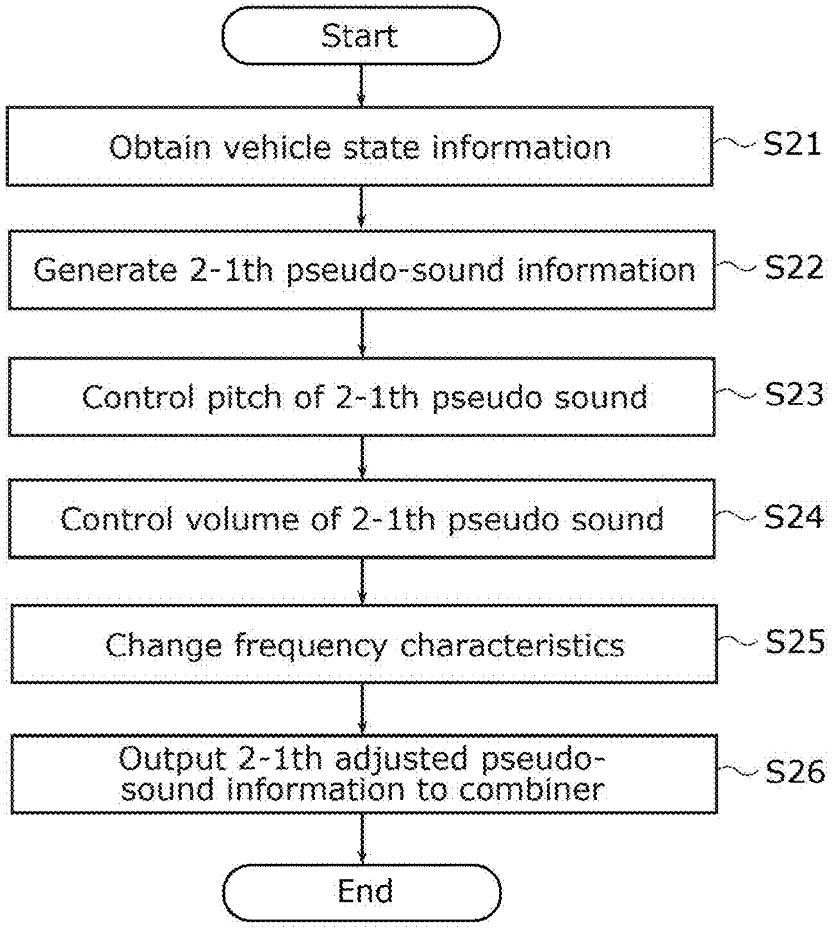
FIG. 3 is a flowchart illustrating processing operations performed when a controlled 2-1th pseudo sound is output to the combiner.

FIG. 3 is a flowchart illustrating processing operations performed when a controlled 2-1th pseudo sound is output to combiner 53. FIG. 3 illustrates processing operations performed by obtainer 51, second sound control device 20, and combiner 53.

First, obtainer 51 obtains vehicle state information, and outputs the obtained vehicle state information to second sound control device 20 (S21).

Next, first sound source generator 21 included in second sound control device 20 generates, based on the vehicle state information obtained from obtainer 51, 2-1th pseudo-sound information that is information indicating a 2-1th pseudo sound corresponding to a traveling state of vehicle 1 indicated in the vehicle state information (S22). First sound source generator 21 may generate the 2-1th pseudo-sound information by obtaining, from storage 54, information indicating a pseudo sound that corresponds to the traveling state of vehicle 1 indicated in the vehicle state information. Moreover, first sound source generator 21 may generate the 2-1th pseudo-sound information by obtaining, from obtainer 51, information indicating driving sounds of the electric motor, internal-combustion engine, and the like which are picked up by obtainer 51. First sound source generator 21 may use a first table showing relationships between traveling states indicated in the vehicle state information and corresponding sounds to generate the 2-1th pseudo-sound information indicating a 2-1th pseudo sound whose tone is freely modulated according to the vehicle state information.

Next, when second pitch controller 22 obtains the 2-1th pseudo-sound information from first sound source generator 21, second pitch controller 22 controls the pitch of the 2-1th pseudo sound indicated in the obtained 2-1th pseudo-sound information (S23). Second pitch controller 22 outputs, to second volume controller 23, the 2-1th pseudo-sound information that is the 2-1th pseudo sound whose pitch has been controlled.

Next, when second volume controller 23 obtains, from second pitch controller 22, the 2-1th pseudo-sound information indicating the 2-1th pseudo sound whose pitch has been controlled, second volume controller 23 controls the volume of the 2-1th pseudo sound whose pitch has been controlled (S24). Second volume controller 23 outputs, to second filter 24, the 2-1th pseudo-sound information that is the 2-1th pseudo sound whose volume has been further controlled, namely the 2-1th pseudo sound whose pitch and volume have been controlled.

Next, when second filter 24 obtains, from second volume controller 23, the 2-1th pseudo-sound information that is the 2-1th pseudo sound whose pitch and volume have been controlled, second filter 24 extracts, from the obtained 2-1th pseudo-sound information, a 2-1th pseudo sound that is a signal in a set frequency band (a signal whose frequency characteristics have been changed) (S25).

Next, second filter 24 outputs the 2-1th pseudo sound whose frequency has been changed to combiner 53. In other words, second sound control device 20 generates the 2-1th pseudo sound based on the vehicle state information, generates 2-1th adjusted pseudo-sound information indicating a pseudo sound obtained by controlling the pitch, volume, etc.

of the 2-1th pseudo sound based on the vehicle state information, and outputs the generated 2-1th adjusted pseudo-sound information to combiner 53 (S26).

With this, combiner 53 can combine, into a composite sound, the first pseudo sounds indicated in the first adjusted pseudo-sound information output by first sound control device 10 and the controlled 2-1th pseudo sound indicated in the 2-1th adjusted pseudo-sound information output by second sound control device 20, to output first composite-sound information indicating the composite sound to the acoustic device. The acoustic device outputs the composite sound indicated in the first composite-sound information, namely a combination of the first pseudo sounds and the controlled 2-1th pseudo sound.

Thereafter, pseudo-sound generation device 2 ends the processing operations shown in the flowchart of FIG. 3.

Operation Example 3

Figure 4:
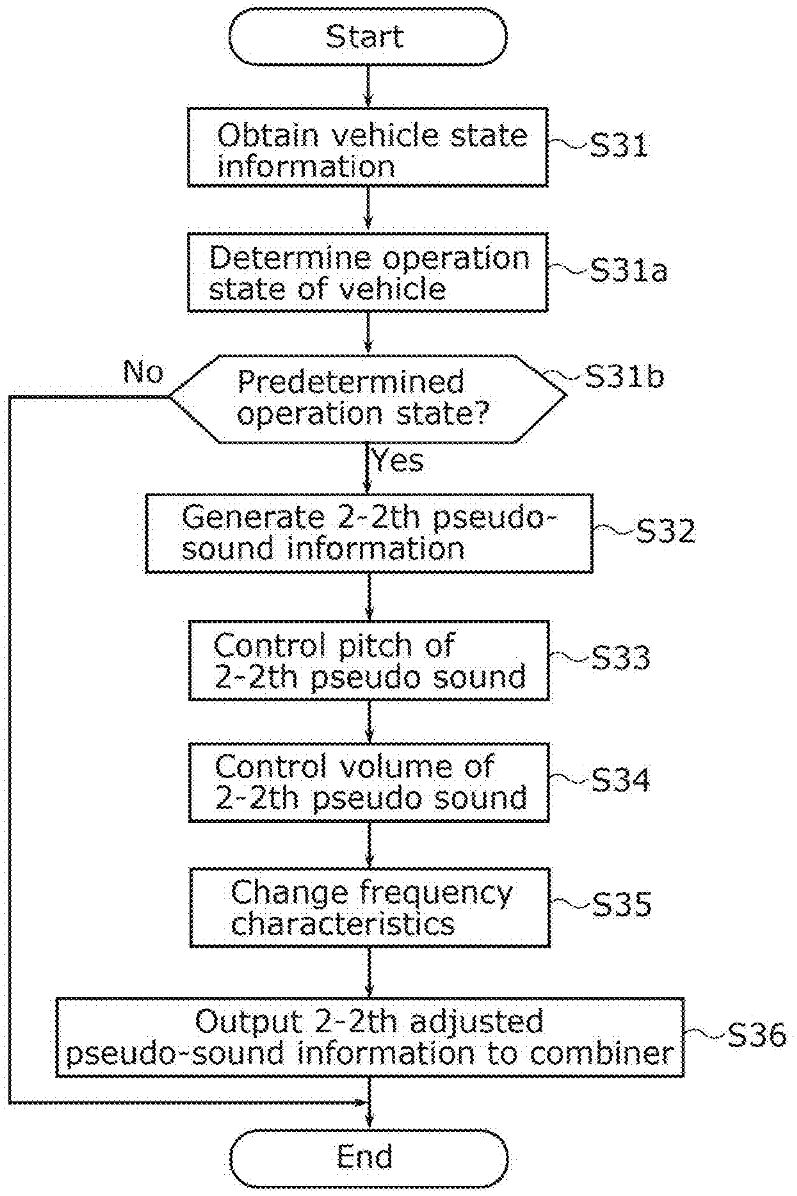
FIG. 4 is a flowchart illustrating processing operations performed when a controlled 2-2th pseudo sound is output to the combiner.

FIG. 4 is a flowchart illustrating processing operations performed when a controlled 2-2th pseudo sound is output to combiner 53. FIG. 4 illustrates processing operations performed by obtainer 51, third sound control device 30, and combiner 53.

First, obtainer 51 obtains vehicle state information, and outputs the obtained vehicle state information to determiner 52 (S31).

Next, determiner 52 determines an operation state of vehicle 1, based on the vehicle state information obtained by obtainer 51 (S31*a*).

Next, determiner 52 determines whether vehicle 1 is in a predetermined operation state, based on the vehicle state information (S31*b*).

When determiner 52 determines that a result of the determination does not apply to the predetermined operation state (No. in S31*b*), determiner 52 does not output the result of the determination to second sound source generator 31. Thereafter, pseudo-sound generation device 2 ends the processing operations shown in the flowchart of FIG. 4.

Conversely, when determiner 52 determines that the result of the determination applies to the predetermined operation state (Yes in S31*b*), determiner 52 outputs, as the result of the determination, the predetermined operation state indicated in the vehicle state information to third sound control device 30.

Next, second sound source generator 31 included in third sound control device 30 generates, based on the result of the determination made by determiner 52 using the vehicle state information, 2-2th pseudo-sound information that is information indicating a 2-2th pseudo sound corresponding to a traveling state of vehicle 1 indicated in the vehicle state information (S32).

Next, when third pitch controller 32 obtains the 2-2th pseudo-sound information from second sound source generator 31, third pitch controller 32 controls the pitch of the 2-2th pseudo sound indicated in the obtained 2-2th pseudo-sound information (S33). Third pitch controller 32 outputs the 2-2th pseudo-sound information that is the 2-2th pseudo sound whose pitch has been controlled to third volume controller 33.

Next, when third volume controller 33 obtains, from third pitch controller 32, the 2-2th pseudo-sound information indicating the 2-2th pseudo sound whose pitch has been controlled, third volume controller 33 controls the volume of the 2-2th pseudo sound whose pitch has been controlled (S34). Third volume controller 33 outputs, to third filter 34, the 2-2th pseudo-sound information that is the 2-2th pseudo sound whose volume has been further controlled, namely the 2-2th pseudo sound whose pitch and volume have been controlled.

Next, when third filter 34 obtains, from third volume controller 33, the 2-2th pseudo-sound information that is the 2-2th pseudo sound whose pitch and volume have been controlled, third filter 34 extracts, from the obtained 2-2th pseudo-sound information, a 2-2th pseudo sound that is a signal in a set frequency band (a signal whose frequency characteristics have been changed) (S35).

Next, third filter 34 outputs, to combiner 53, the 2-2th pseudo sound whose frequency has been changed. In other words, third sound control device 30 generates the 2-2th pseudo sound based on the vehicle state information, generates 2-2th adjusted pseudo-sound information that is information indicating a pseudo sound obtained by controlling the pitch, volume, etc. of the 2-2th pseudo sound based on the vehicle state information, and outputs the generated 2-2th adjusted pseudo-sound information to combiner 53 (S36).

With this, combiner 53 can combine, into a composite sound, the first pseudo sounds indicated in the first adjusted pseudo-sound information output by first sound control device 10 and the controlled 2-2th pseudo sound indicated in the 2-2th adjusted pseudo-sound information output by third sound control device 30, to output second composite-sound information indicating the composite sound to the acoustic device. The acoustic device outputs the composite sound indicated in the second composite-sound information, namely a combination of the first pseudo sounds and the controlled 2-2th pseudo sound.

Combiner 53 can also combine, into a composite sound, the first pseudo sounds indicated in the first adjusted pseudo-sound information output by first sound control device 10, the controlled 2-1th pseudo sound indicated in the 2-1th adjusted pseudo-sound information output by second sound control device 20, and the controlled 2-2th pseudo sound indicated in the 2-2th adjusted pseudo-sound information output by third sound control device 30, to output third composite-sound information indicating the composite sound to the acoustic device. The acoustic device outputs the composite sound indicated in the third composite-sound information, namely a combination of the first pseudo sounds, the controlled 2-1th pseudo sound, and the controlled 2-2th pseudo sound.

Furthermore, combiner 53 may output only the 2-2th pseudo-sound information to the acoustic device. In other words, even if combiner 53 obtains the first adjusted pseudo-sound information output by first sound control device 10, combiner 53 may abandon the first adjusted pseudo-sound information and may output only the 2-2th pseudo-sound information to the acoustic device. In this case, the acoustic device outputs only the controlled 2-2th pseudo sound.

Note that combiner 53 can output only the first pseudo-sound information to the acoustic device.

Thereafter, pseudo-sound generation device 2 ends the processing operations shown in the flowchart of FIG. 4.

Advantageous Effects

Next, advantageous effects produced by pseudo-sound generation device 2 according to the present embodiment will be described.

Although conventional engine sound output devices reproduce stored engine sounds to give passengers in a vehicle a real feeling of a traveling vehicle and a feeling of comfortable driving, the conventional engine sound output devices have limited changes in tones corresponding to traveling conditions of the traveling vehicle and small traveling sound variations.

In view of the above, pseudo-sound generation device 2 according to the present embodiment as has been described above is pseudo-sound generation device 2 that outputs a pseudo sound corresponding to a traveling state of vehicle 1. Pseudo-sound generation device 2 includes: sound reproducer 11 that obtains and outputs first pseudo-sound information indicating first pseudo sounds corresponding to vehicle state information that pertains to traveling states of vehicle 1; a first controller that generates, based on the vehicle state information, first adjusted pseudo-sound information indicating pseudo sounds that are the first pseudo sounds that have been adjusted and are indicated in the first pseudo-sound information output by sound reproducer 11, and outputs the first adjusted pseudo-sound information generated; a sound source generator that generates, based on the vehicle state information, second pseudo-sound information indicating a second pseudo sound, and outputs the second pseudo-sound information generated; and a second controller that generates second adjusted pseudo-sound information indicating a pseudo sound that is the second pseudo sound that has been adjusted and is indicated in the second pseudo-sound information output by the sound source generator, and outputs the second adjusted pseudo-sound information generated.

With this, the first controller can output the first adjusted pseudo-sound information and the second controller can generate, based on the vehicle state information, the second pseudo-sound information and outputs the second pseudo-sound information. Accordingly, traveling sounds corresponding to traveling states of vehicle 1 can be played inside the passenger cabin of vehicle 1.

Therefore, pseudo-sound generation device 2 can output various traveling sounds of vehicle 1. As a result, it is possible to give passengers in vehicle 1 a real feeling of traveling vehicle 1 and a feeling of operating vehicle 1.

In pseudo-sound generation device 2 according the present embodiment, the sound source generator includes first sound source generator 21 that generates, based on the vehicle state information, 2-1th pseudo-sound information indicating a 2-1th pseudo sound different from the first pseudo sounds, and outputs the 2-1th pseudo-sound information generated. The 2-1th pseudo sound is included in the second pseudo sound. The 2-1th pseudo-sound information is included in the second pseudo-sound information. The second controller generates 2-1th adjusted pseudo-sound information indicating a pseudo sound that is the 2-1th pseudo sound that has been adjusted and is indicated in the 2-1th pseudo-sound information output by first sound source generator 21, and outputs the 2-1th adjusted pseudo-sound information generated. The 2-1th adjusted pseudo-sound information is included in the second adjusted pseudo-sound information.

With this, first sound source generator 21 generates 2-1th pseudo-sound information based on the vehicle state information, and the second controller can adjust the 2-1th sound indicated in the 2-1th pseudo-sound information based on the vehicle state information. For this reason, various traveling sounds of vehicle 1 corresponding to traveling states of vehicle 1 can be played inside the passenger cabin of vehicle 1.

In pseudo-sound generation device 2 according to the present embodiment, first sound source generator 21 generates, based on the vehicle state information, the 2-1th pseudo-sound information indicating the 2-1th pseudo sound that imitates a sound generated according to a continuous traveling state of vehicle 1, and outputs the 2-1th pseudo-sound information generated to the second controller.

With this, the 2-1th pseudo-sound information indicating a sound corresponding to a continuous traveling state of vehicle 1 can be output, therefore a traveling sound that is continuously generated according to a usual traveling state of vehicle 1 can be played inside the passenger cabin.

Pseudo-sound generation device 2 according to the present embodiment further includes combiner 53 that combines, into a composite sound, (i) the pseudo sounds indicated in the first adjusted pseudo-sound information output by the first controller and (ii) the 2-1th pseudo sound that has been controlled and is indicated in the 2-1th adjusted pseudo-sound information output by the second controller, and outputs first composite-sound information indicating the composite sound.

With this, the pseudo sound indicated in the first adjusted pseudo-sound information and the 2-1th pseudo sound indicated in the 2-1th adjusted pseudo-sound information can be combined into a composite sound. Accordingly, the composite sound can be played inside the passenger cabin. As a result, it is possible to give passengers in vehicle 1 a more real feeling of traveling vehicle 1 and a more real feeling of operating vehicle 1.

Pseudo-sound generation device 2 according to the present embodiment further includes obtainer 51 that obtains the vehicle state information.

With this, the vehicle state information can be obtained. Accordingly, the vehicle state information can be used for generating a pseudo sound based on the vehicle state information.

Pseudo-sound generation device 2 according to the present embodiment further includes determiner 52 that determines an operation state of vehicle 1 based on the vehicle state information obtained by obtainer 51.

With this, an operation state of vehicle 1 can be determined based on the vehicle state information. Accordingly, the vehicle state information can be used for determining whether to play a traveling sound inside the passenger cabin of vehicle 1 according to an operation state of vehicle 1, and can be used for generating a traveling sound corresponding to the operation state of vehicle 1.

In pseudo-sound generation device 2 according to the present embodiment, the sound source generator includes second sound source generator 31 that generates, based on the vehicle state information, 2-2th pseudo-sound information indicating a 2-2th pseudo sound different from the first pseudo sounds, and outputs the 2-2th pseudo-sound information generated. The 2-2th pseudo sound is included in the second pseudo sound. The 2-2th pseudo-sound information is included in the second pseudo-sound information. The second controller generates 2-2th adjusted pseudo-sound information indicating a pseudo sound that is the 2-2th pseudo sound that has been adjusted and is indicated in the 2-2th pseudo-sound information output by second sound source generator 31, and outputs the 2-2th adjusted pseudo-sound information generated. The 2-2th adjusted pseudo-sound information is included in the second adjusted pseudo-sound information.

With this, second sound source generator 31 generates 2-2th pseudo-sound information based on the vehicle state information, and the second controller can adjust the 2-2th pseudo sound indicated in the 2-2th pseudo-sound information based on the vehicle state information. For this reason, various traveling sounds of vehicle 1 corresponding to traveling states of vehicle 1 can be played inside the passenger cabin of vehicle 1.

In pseudo-sound generation device 2 according to the present embodiment, second sound source generator 31 generates, based on a result of determination made by determiner 52 using the vehicle state information, the 2-2th pseudo-sound information indicating the 2-2th pseudo sound that imitates a sound generated according to a sporadic traveling state of vehicle 1, and outputs the 2-2th pseudo-sound information generated to the second controller.

With this, the 2-2th pseudo-sound information corresponding to a sporadic traveling state of vehicle 1 can be output. Therefore, a traveling sound that is sporadically generated according to a usual traveling state of vehicle 1 can be played inside the passenger cabin.

Pseudo-sound generation device 2 according to the present embodiment further includes combiner 53 that combines, into a composite sound, (i) the pseudo sounds indicated in the first adjusted pseudo-sound information output by the first controller and (ii) the 2-2th pseudo sound that has been controlled and is indicated in the 2-2th adjusted pseudo-sound information output by the second controller, and outputs second composite-sound information indicating the composite sound.

With this, the pseudo sounds indicated in the first adjusted pseudo-sound information and the 2-2th pseudo sound indicated in the 2-2th adjusted pseudo-sound information can be combined into a composite sound. Accordingly, the composite sound can be played inside the passenger cabin. As a result, it is possible to give passengers in vehicle 1 a more real feeling of traveling vehicle 1 and a more real feeling of operating vehicle 1 for passengers of vehicle 1.

Pseudo-sound generation device according to the present embodiment further includes combiner 53 that combines, into a composite sound, (i) the pseudo sounds indicated in the first adjusted pseudo-sound information output by the first controller, (ii) the 2-1th pseudo sound that has been controlled and is indicated in the 2-1th adjusted pseudo-sound information output by the second controller, (iii) and the 2-2th pseudo sound that has been controlled and is indicated in the 2-2th adjusted pseudo-sound information output by the second controller, and outputs third composite-sound information indicating the composite sound.

With this, the pseudo sounds indicated in the first adjusted pseudo-sound information, the 2-1th pseudo sound indicated in the 2-1th adjusted pseudo-sound information, and the 2-2th pseudo sound indicated in the 2-2th adjusted pseudo-sound information can be combined into a composite sound. Accordingly, the composite sound can be played inside the passenger cabin. As a result, it is possible to give passengers in vehicle 1 a more real feeling of traveling vehicle 1 and a more real feeling of operating vehicle 1.

In pseudo-sound generation device 2 according to the present embodiment, determiner 52 determines the operation state of vehicle 1 based on the vehicle state information obtained by obtainer 51. When determiner 52 determines, based on the vehicle state information, that the operation state is the sporadic traveling state of the vehicle, combiner 53 outputs only the 2-2th pseudo-sound information.

With this, an operation state of vehicle 1 can be determined based on the vehicle state information. Accordingly, the vehicle state information can be used for determining whether to play a traveling sound inside the passenger cabin of vehicle 1 according to an operation state of vehicle 1, and can be used for generating a traveling sound corresponding to the operation state of vehicle 1.

In pseudo-sound generation device 2 according to the present embodiment, the sound generator is a synthesizer that employs a calculation-type sound source method.

With this, the 2-1th pseudo sound or the 2-2th pseudo sound can be added to the first pseudo sounds. Accordingly, various traveling sounds can be output to the interior of the passenger cabin. As a result, it is possible to give passengers in vehicle 1 a more real feeling of traveling vehicle 1 and a more real feeling of operating vehicle 1.

[Other Variations, etc.]

Hereinbefore, the present disclosure has been described based on the embodiment, but the present disclosure is not limited to the embodiment, etc.

For example, when first filter 14, second filter 24, and third filter 34 included in the pseudo-sound generation device according to the present embodiment are each a variable filter, a higher frequency may be extracted when the speed of vehicle 1 which is indicated the vehicle state information is greater than or equal to a predetermined threshold, and a lower frequency may be extracted when the speed of vehicle 1 is less than the predetermined threshold.

First sound control device 10, second sound control device 20, and third sound control device 30 included in the pseudo-sound generation device according to the present embodiment may turn down the volume when environmental sounds around vehicle 1 are soft such as during nighttime, such that passengers will not perceive pseudo sounds to be loud. Conversely, when environment sounds around vehicle 1 are loud, such as when a road is congested due to other vehicles, the volume may be turned up so as to cause the passengers to perceive the pseudo sounds. The obtainer may obtain sounds surrounding vehicle 1, namely environment sounds.

In first sound control device 10 included in the pseudo-sound generation device according to the present embodiment, first pitch controller 12 adjusts the pitch of first pseudo sounds before first volume controller 13 adjusts the volume of the first pseudo sounds whose pitch has been adjusted; however, the foregoing processes may be conversely performed. Moreover, in second sound control device 20, second pitch controller 22 adjusts the pitch of a 2-1th pseudo sound before second volume controller 23 adjusts the volume of the 2-1th pseudo sound whose pitch has been adjusted; however, the foregoing processes may be conversely performed. In addition, in third sound control device 30, third pitch controller 32 adjusts the pitch of a 2-2th pseudo sound before third volume controller 33 adjusts the volume of the 2-2th pseudo sound whose pitch has been adjusted; however, the foregoing processes may be conversely performed.

The pseudo-sound generation device according to the present embodiment may include, as elements, one or more acoustic devices.

In the pseudo-sound generation device according to the present embodiment, when first sound control device 10 outputs first adjusted pseudo-sound information to combiner 53 and third sound control device 30 outputs 2-2th adjusted pseudo-sound information to combiner 53, an output of 2-1th adjusted pseudo-sound information from second sound control device 20 may be suspend for a predetermined period.

Moreover, each of the first sound control device, second sound control device, determiner, third sound control device, and combiner included in the pseudo-sound generation device according to the present embodiment is typically implemented as an LSI circuit, which is an integrated circuit. These elements may be individually implemented as a single chip, or some or all of the elements may be implemented as a single chip.

The integrated circuit is not limited to an LSI circuit; a dedicated circuit or generic processor may be used to implement circuit integration. A field programmable gate array (FPGA) which can be programmed after an LSI circuit is manufactured or a reconfigurable processor which can reconfigure connection or setting of circuit cells inside an LSI circuit may be used.

Note that in the above-described embodiment, each of the elements may be configured as a dedicated hardware product or may be implemented by executing a software program suitable for each element. Each element may be implemented as a result of a program execution unit, such as a central processing unit (CPU), processor or the like, loading and executing a software program stored in a storage medium such as a hard disk or a semiconductor memory.

All of figures used above are mere examples for presenting specific examples of the present disclosure, and therefore the embodiment of the present disclosure is not limited to the exemplified figures.

The block diagrams each illustrate one example of the division of functional blocks. The functional blocks may be implemented as a single functional block, a single functional block may be broken up into functional blocks, and part of one function may be transferred to another functional block. Moreover, the functions of a plurality of function blocks having similar functions may be processed by a single hardware product or a single software program in parallel or by time-division.

Furthermore, the order in which the steps are executed in a flowchart is a mere example for presenting a specific example of the present disclosure. The order may be other than the presented order. Some of the above-described steps may be executed at the same time as (in parallel with) other steps.

Those skilled in the art will readily appreciate that various modifications may be made in the embodiment and that other embodiments may be obtained by optionally combining the elements and functions of the embodiment without materially departing from the novel teachings and advantages of the present disclosure. Accordingly, all such modifications and other embodiments are included in the present disclosure.

While an embodiment, etc. have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-006957 filed on Jan. 20, 2022 and PCT International Application No. PCT/JP2022/046787 filed on Dec. 20, 2022.

INDUSTRIAL APPLICABILITY

The pseudo-sound generation device according to the present disclosure is applicable to vehicles, such as automobiles.

The invention claimed is:

1. A pseudo-sound generation device that outputs a pseudo sound corresponding to a traveling state of a vehicle, the pseudo-sound generation device comprising:

a sound reproducer that obtains and outputs first pseudo-sound information indicating first pseudo sounds corresponding to vehicle state information that pertains to traveling states of the vehicle;

a first controller that generates, based on the vehicle state information, first adjusted pseudo-sound information indicating pseudo sounds that are the first pseudo sounds that have been adjusted, and outputs the first adjusted pseudo-sound information generated, the first pseudo sounds being indicated in the first pseudo-sound information output by the sound reproducer;

a sound source generator that generates, based on the vehicle state information, second pseudo-sound information indicating a second pseudo sound, and outputs the second pseudo-sound information generated;

a second controller that generates second adjusted pseudo-sound information indicating a pseudo sound that is the second pseudo sound that has been adjusted, and outputs the second adjusted pseudo-sound information generated, the second pseudo sound being indicated in the second pseudo-sound information output by the sound source generator;

an obtainer that obtains the vehicle state information; and a determiner that determines an operation state of the vehicle based on the vehicle state information obtained by the obtainer;

wherein the sound source generator includes a first sound source generator that generates, based on the vehicle state information, 2-1th pseudo-sound information indicating a 2-1th pseudo sound, and outputs the 2-1th pseudo-sound information generated, the 2-1th pseudo sound being different from the first pseudo sounds, the 2-1th pseudo sound is included in the second pseudo sound, the 2-1th pseudo-sound information is included in the second pseudo-sound information, the second controller generates 2-1th adjusted pseudo-sound information indicating a pseudo sound that is the 2-1th pseudo sound that has been adjusted, and outputs the 2-1th adjusted pseudo-sound information generated, the 2-1th pseudo sound being indicated in the 2-1th pseudo-sound information output by the first sound source generator, and the 2-1th adjusted pseudo-sound information is included in the second adjusted pseudo-sound information, wherein the sound source generator includes a second sound source generator that generates, based on the vehicle state information, 2-2th pseudo-sound information indicating a 2-2th pseudo sound, and outputs the 2-2th pseudo-sound information generated, the 2-2th pseudo sound being different from the first pseudo sounds, the 2-2th pseudo sound is included in the second pseudo sound, the 2-2th pseudo-sound information is included in the second pseudo-sound information, the second controller generates 2-2th adjusted pseudo-sound information indicating a pseudo sound that is the 2-2th pseudo sound that has been adjusted, and outputs the 2-2th adjusted pseudo-sound information generated, the 2-2th pseudo sound being indicated in the 2-2th pseudo-sound information output by the second sound source generator, and the 2-2th adjusted pseudo-sound information is included in the second adjusted pseudo-sound information, a combiner that combines, into a composite sound, (i) the pseudo sounds indicated in the first adjusted pseudo-sound information output by the first controller and (ii) the 2-2th pseudo sound that has been controlled and is indicated in the 2-2th adjusted pseudo-sound information output by the second controller, and outputs second composite-sound information indicating the composite sound, wherein the determiner determines the operation state of the vehicle based on the vehicle state information obtained by the obtainer, and when the determiner determines, based on the vehicle state information, that the operation state is a sporadic traveling state of the vehicle, the combiner abandons the first adjusted pseudo-sound information and outputs only the 2-2th pseudo-sound information.

2. The pseudo-sound generation device according to claim 1, wherein the sound source generator is a synthesizer that employs a calculation-type sound source method.

* * * * *